(12) United States Patent
Ohishi et al.

(10) Patent No.: US 7,633,563 B2
(45) Date of Patent: Dec. 15, 2009

(54) OPTICAL ELEMENT, OPTICAL APPARATUS AND IMAGING APPARATUS HAVING PARTICULAR LIGHT CONTROL STRUCTURE

(75) Inventors: Tadahiro Ohishi, Gifu (JP); Kazuhiro Tanaka, Tokyo (JP)

(73) Assignee: Sony Corporation (JP)

( * ) Notice: Subject to any disclaimer, the term of this patent is extended or adjusted under 35 U.S.C. 154(b) by 352 days.

(21) Appl. No.: 11/732,121

(22) Filed: Apr. 2, 2007

(65) Prior Publication Data
US 2007/0263150 A1  Nov. 15, 2007

(30) Foreign Application Priority Data
Apr. 5, 2006 (JP) .......................... P2006-103922

(51) Int. Cl.
*G02F 1/1335* (2006.01)
*G02F 1/1337* (2006.01)

(52) U.S. Cl. .............. 349/8; 349/96; 349/128

(58) Field of Classification Search .................. 349/8, 349/96, 128
See application file for complete search history.

(56) References Cited

U.S. PATENT DOCUMENTS 6,456,345 B1 * 9/2002 Ise ............................ 349/96
6,720,742 B2 * 4/2004 Yanagida et al. ............ 315/291

FOREIGN PATENT DOCUMENTS

JP        11-326894 A    11/1999

* cited by examiner

*Primary Examiner*—Mike Qi
(74) *Attorney, Agent, or Firm*—Lerner, David, Littenberg, Krumholz & Mentlik, LLP

(57) ABSTRACT

An optical element is disclosed. The optical element may include a container having a holding chamber; a polarized or conductive and transparent first liquid filled in the holding chamber; a liquid crystal filled in the holding chamber and not mutually mixing with the first liquid; first and second electrodes applying an electric field to the first liquid; and voltage application means for applying voltage between the first electrode and the second electrode.

14 Claims, 10 Drawing Sheets

OPTICAL ELEMENT, OPTICAL APPARATUS AND IMAGING APPARATUS HAVING PARTICULAR LIGHT CONTROL STRUCTURE

CROSS-REFERENCE TO RELATED APPLICATIONS

This application claims priority from Japanese Patent Application No. JP2006-103922 filed in the Japanese Patent Office on Apr. 5, 2006, the entire content of which is incorporated herein by reference.

BACKGROUND OF THE INVENTION

1. Field of the Invention

The present invention relates to an optical element, an optical apparatus and an imaging apparatus.

2. Description of the Related Art

A liquid crystal optical apparatus containing a guest-host liquid crystal, in which a dichroic coloring matter is guest, has been proposed in the past. However, it is difficult to sufficiently increase the dynamic range of the amount of transmitted light without voltage application and with voltage application.

This depends on the fact that the optical density ratio (absorbance in absorption mode/absorbance in transmittance mode) of a current dichroic coloring matter is not sufficiently high. For camera applications in particular, an absorbance of 90% or higher may be required in the transmittance mode, that is, the maximum transmittance. However, since the optical density ratio of the dichroic coloring matter is not sufficiently high as described above, the minimum transmittance may not be decreased to satisfy the maximum transmittance. In other words, the full performance as a diaphragm (dimmer) may not be delivered. Conversely, satisfying the minimum transmittance may not satisfy the maximum transmittance as high as or higher than 90%, which is a trade-off relationship.

Since the guest-host liquid crystal only may not increase the dynamic range in this way, a dimmer including a mechanical structure with the direction of the polarized light passing through a polarizer, for example, in parallel with the absorption axis of the dichroic coloring matter has been proposed which puts in and out the polarizer to and from the optical path such that both necessary minimum transmittance and maximum transmittance can be obtained (refer to JP-A-11-326894 (Patent Document 1)).

SUMMARY OF THE INVENTION

However, the dimmer is disadvantageous for decreasing the size and costs since the mechanical structure may be necessary for putting in and out the polarizer and is also disadvantageous for decreasing the power consumption since the power is consumed by an actuator such as a motor that puts in and out the polarizer.

Accordingly, it is desirable to propose an optical element, which functions as a dimmer and is advantageous for decreasing the size, costs and power consumption, and an optical apparatus and an imaging apparatus, which include the optical element.

According to an embodiment of the present invention, there is provided an optical element which may include a container having a holding chamber, a polarized or conductive and transparent first liquid filled in the holding chamber, a liquid crystal filled in the holding chamber and not mutually mixing with the first liquid, first and second electrodes applying an electric field to the first liquid, and voltage application means for applying voltage between the first electrode and the second electrode, wherein the change of the position subject to the voltage application by the voltage application means to the first and second electrodes may move the first liquid in the liquid crystal within the holding chamber, the liquid crystal may contain a guest-host liquid crystal, the holding chamber partially may have an adjustment chamber through which light passes and a lay-by chamber in the remaining part, the adjustment chamber and the lay-by chamber may have first and second end walls facing against each other in the direction that light passes through, the first electrode may be provided on one end wall of the first and second end walls of the adjustment chamber and lay-by chamber, the second electrode may be provided on the other end wall of the first and second end walls, and the second electrode may have a first electrode member facing the adjustment chamber and a second electrode member being separated from the first electrode member and facing the lay-by chamber.

According to another embodiment, there is provided an optical apparatus which may include two optical elements each having a container having a holding chamber, a polarized or conductive and transparent first liquid filled in the holding chamber, a liquid crystal filled in the holding chamber and not mutually mixing with the first liquid, first and second electrodes applying an electric field to the first liquid, and voltage application means for applying voltage between the first electrode and the second electrode, wherein the change of the position subject to the voltage application by the voltage application means to the first and second electrodes may move the first liquid in the liquid crystal within the holding chamber, the liquid crystal may contain a guest-host liquid crystal, the holding chamber partially may have an adjustment chamber through which light passes and a lay-by chamber in the remaining part, the adjustment chamber and the lay-by chamber may have first and second end walls facing against each other in the direction that light passes through, the first electrode is provided on one end wall of the first and second end walls of the adjustment chamber and lay-by chamber, the second electrode may be provided on the other end wall of the first and second end walls, the second electrode may have a first electrode member facing the adjustment chamber and a second electrode member being separated from the first electrode member and facing the lay-by chamber, a liquid crystal alignment film may cover the surface of the first electrode facing the adjustment chamber and the surface of the first electrode member facing the adjustment chamber, the two optical elements may have the adjustment chambers in the direction that light passes through, the adjustment chambers may have the thickness in a same direction, and the direction of alignment of the liquid crystal alignment film of one optical element of the two optical elements may be orthogonal to the direction of alignment of the liquid crystal alignment film of the other optical element of the two optical elements at the sight from the direction that light passes through.

According to another embodiment of the invention, there is provided an optical element which may include a container having a holding chamber, a polarized or conductive liquid crystal filled in the holding chamber, a second liquid filled in the holding chamber and not mutually mixing with the liquid crystal, first and second electrodes applying an electric field to the liquid crystal, and voltage application means for applying voltage between the first electrode and the second electrode, wherein the change of the position subject to the voltage application by the voltage application means to the first and second electrodes may move the liquid crystal in the second liquid within the holding chamber, the liquid crystal may contain a guest-host liquid crystal, the holding chamber partially may have an adjustment chamber through which light passes and a lay-by chamber in the remaining part, the adjustment chamber and the lay-by chamber may have first and second end walls facing against each other in the direction that light passes through, the first electrode may be provided on one end wall of the first and second end walls of the adjustment chamber and lay-by chamber, the second electrode may be provided on the other end wall of the first and second end walls, and the second electrode may have a first electrode member facing the adjustment chamber and a second electrode member being separated from the first electrode member and facing the lay-by chamber.

According to another embodiment of the invention, there is provided an imaging apparatus which may include a shooting optical system guiding a subject image, an imaging device on an optical axis of the shooting optical system, and an optical element before the imaging device on the optical axis, the optical element having a container having a holding chamber, a polarized or conductive and transparent first liquid filled in the holding chamber, a liquid crystal filled in the holding chamber and not mutually mixing with the first liquid, first and second electrodes applying an electric field to the first liquid, and voltage application means for applying voltage between the first electrode and the second electrode, wherein the change of the position subject to the voltage application by the voltage application means to the first and second electrodes may move the first liquid in the liquid crystal within the holding chamber, the liquid crystal may contain a guest-host liquid crystal, the holding chamber partially may have an adjustment chamber through which light passes and a lay-by chamber in the remaining part, the adjustment chamber and the lay-by chamber may have first and second end walls facing against each other in the direction that light passes through, the first electrode may be provided on one end wall of the first and second end walls of the adjustment chamber and lay-by chamber, the second electrode may be provided on the other end wall of the first and second end walls, and the second electrode may have a first electrode member facing the adjustment chamber and a second electrode member being separated from the first electrode member and facing the lay-by chamber.

According to another embodiment of the invention, there is provided an imaging apparatus which may include a shooting optical system guiding a subject image, an imaging device on an optical axis of the shooting optical system, and an optical element before the imaging device on the optical axis, the optical element having a container having a holding chamber, a polarized or conductive liquid crystal filled in the holding chamber, a second liquid filled in the holding chamber and not mutually mixing with the liquid crystal, first and second electrodes applying an electric field to the liquid crystal, and voltage application means for applying voltage between the first electrode and the second electrode, wherein the change of the position subject to the voltage application by the voltage application means to the first and second electrodes may move the liquid crystal in the second liquid within the holding chamber, the liquid crystal may contain a guest-host liquid crystal, the holding chamber partially may have an adjustment chamber through which light passes and a lay-by chamber in the remaining part, the adjustment chamber and the lay-by chamber may have first and second end walls facing against each other in the direction that light passes through, the first electrode may be provided on one end wall of the first and second end walls of the adjustment chamber and lay-by chamber, the second electrode may be provided on the other end wall of the first and second end walls, and the second electrode may have a first electrode member facing the adjustment chamber and a second electrode member being separated from the first electrode member and facing the lay-by chamber.

According to the embodiments of the invention, positioning a transparent first liquid in the adjustment chamber may increase the maximum transmittance, and positioning a liquid crystal in the adjustment chamber may serially adjust the transmittance, which is advantageous for sufficiently increasing the dynamic range of the transmitted light through the optical element and is advantageous for decreasing the size, costs and power consumption since the necessity of the mechanical structure can be eliminated.

Furthermore, according to the embodiments of the invention, positioning a transparent second liquid in the adjustment chamber may increase the maximum transmittance, and positioning a liquid crystal in the adjustment chamber may serially adjust the transmittance, which is advantageous for sufficiently increasing the dynamic range of the transmitted light through the optical element and is advantageous for decreasing the size, costs and power consumption since the necessity of the mechanical structure can be eliminated.

DETAILED DESCRIPTION

First Embodiment

The operational principle of a liquid movement by an electric field will be first described.

Figure 1A:
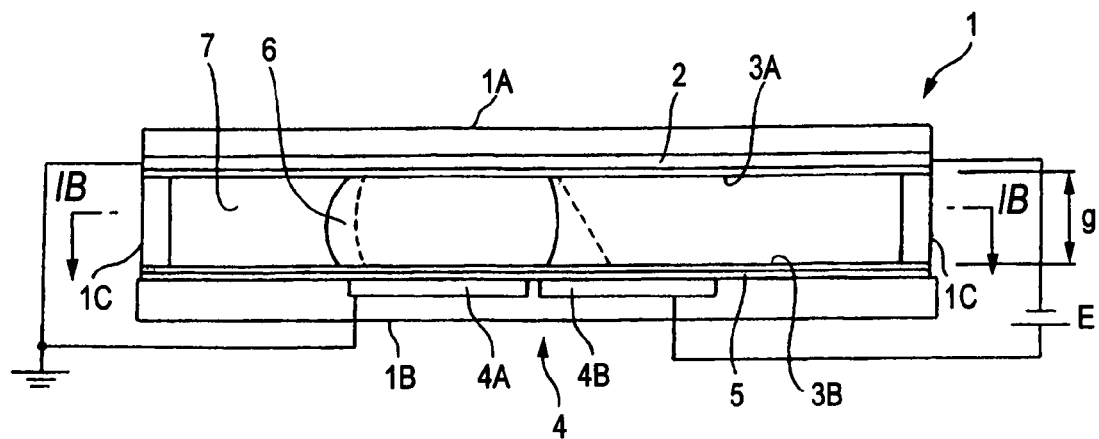
FIG. 1A is a section diagram describing the principle of a liquid movement.
Figure 1B:
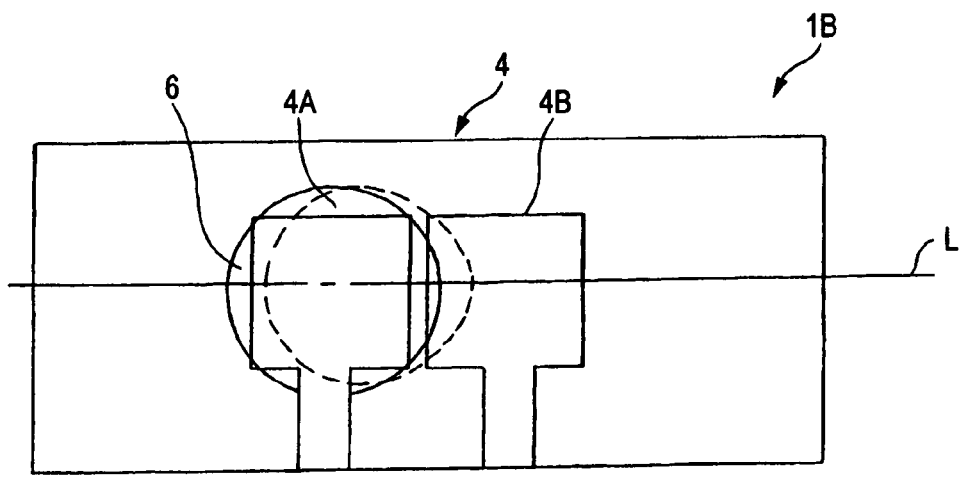
FIG. 1B is a view on the arrows IB in FIG. 1A.

FIG. 1A is a section diagram describing the principle of a liquid movement, and FIG. 1B is a view on the arrows IB in FIG. 1A.

As shown in FIGS. 1A and 1B, a holding chamber 1 is tightly enclosed by first and second end walls 1A and 1B facing against each other and having a space g therebetween in the direction that light passes through and side walls 1C connecting the first and second end walls 1A and 1B.

A first electrode 2 is provided on the entire inner surface of the first end wall 1A, and the surface where the first electrode 2 faces the holding chamber 1 is covered by a water-repellent film 3A.

A second electrode 4 is provided on the inner surface of the second end wall 1B, and the second electrode 4 includes two electrode members 4A and 4B aligned along a virtual axis L extending in the direction orthogonal to the direction in which the first and second end walls 1A and 1B face against each other.

The entire areas of the surfaces of the two electrode members 4A and 4B and the inner surface of the second end wall 1B are covered by an insulating film 5, and the entire area of the surface of the insulating film 5 facing the holding chamber 1 is covered by a water-repellent film 3B.

A first liquid 6 and a second liquid 7 are filled in the holding chamber 1. The first liquid 6 is polarized or conductive, and the second liquid 7 is filled around the first liquid 6 and does not mutually mix with the first liquid 6.

The first electrode 2 faces the first liquid 6 through the water-repellent film 3A, and the second electrode 4 faces the first liquid 6 through the insulating film 5 and the water-repellent film 3B.

The first electrode 2 and the two electrode members 4A and 4B of the second electrode 4 are initially both grounded, and the first liquid 6 at that state is positioned across the entire area of the one electrode member 4A and the part of the other electrode member 4B, which is closer to the electrode member 4A.

At this state, the first liquid 6 has a round form at the plane vision as indicated by the solid line in the FIGS. 1A and 1B due to the surface tension.

When a voltage E is applied to the other electrode member 4B here, the part where the insulating film 5 faces the first liquid 6 is positively charged. Thus, an electric field (electrostatic force) is applied to the part where the first liquid 6 faces the insulating film 5, and negative charges, that is, the molecules of the first liquid 6 are pulled to the position where the first liquid 6 faces the insulating film 5.

Then, the first liquid 6 changes the form as being pulled toward the electrode member 4B as indicated by the broken lines in FIGS. 1A and 1B. In the end, all of the first liquid 6 surrounded by the second liquid 7 moves from the above of the one electrode member 4A to the above of the other electrode member 4B in the direction of the extension of the virtual axis L.

The water-repellent films 3A and 3B act for reducing the resistance, which is caused between the liquid 6 and the first and second end walls 1A and 1B when the first liquid 6 moves above the first and second electrodes 2 and 4, such that the first liquid 6 can move thereabove easily.

In this way, the polarized or conductive first liquid 6 is moved by applying an electric field to the first liquid 6 by the first and second electrodes 2 and 4.

Next, an optical element 10 of this embodiment will be described.

According to this embodiment, the optical element 10 functions as a dimmer (diaphragm) that adjusts the amount of light.

Figure 2:
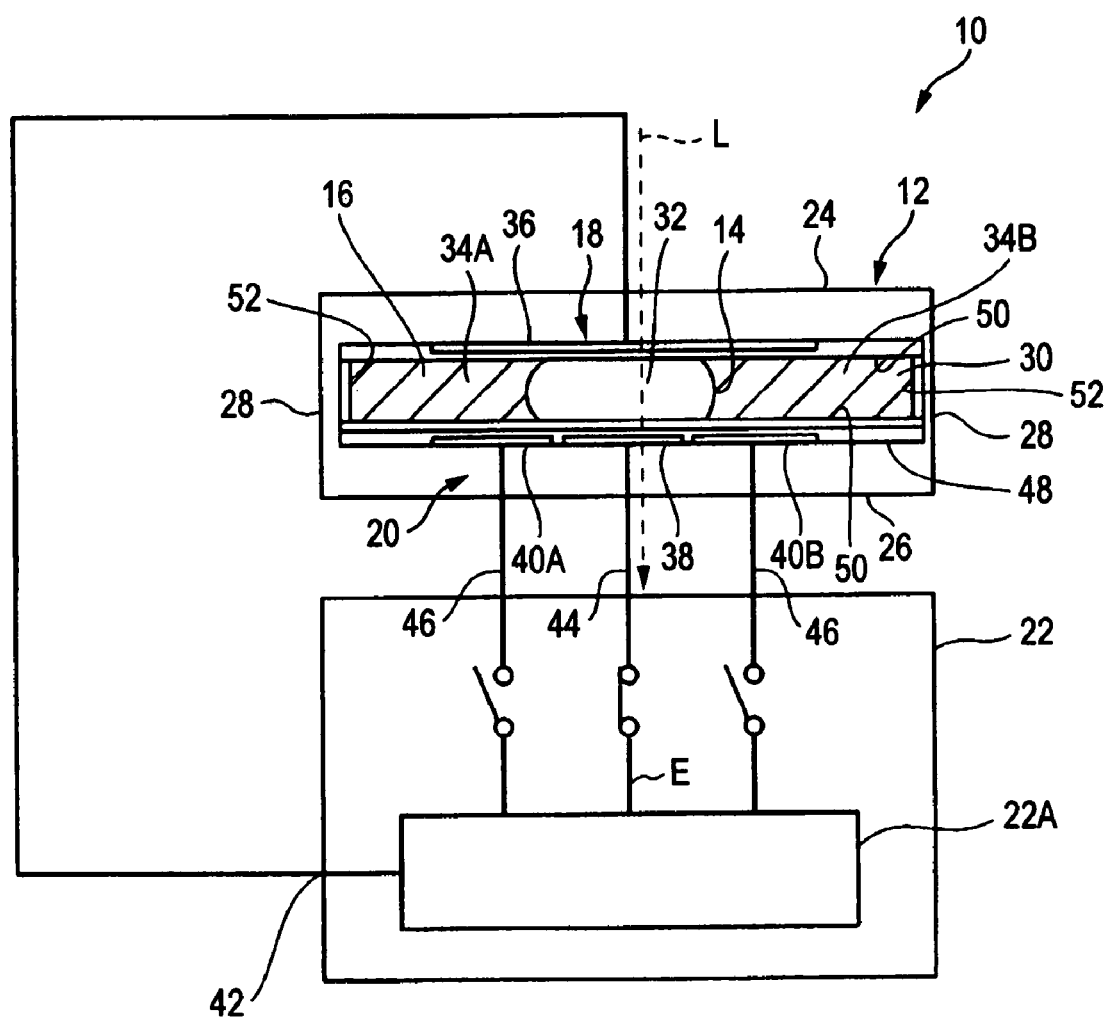
FIG. 2 is a section diagram showing a construction of an optical element 10.
Figure 3:
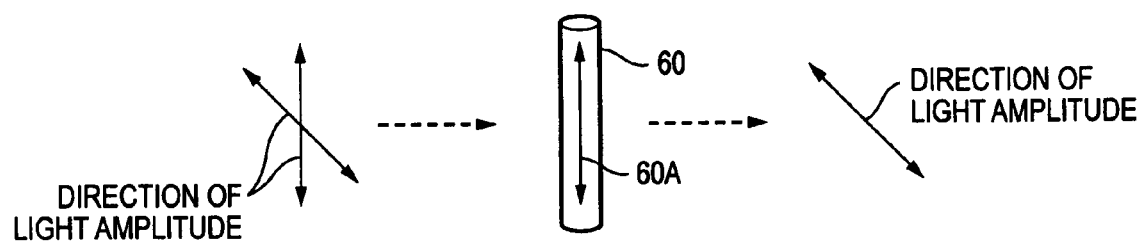
FIG. 3 is an explanatory diagram of a dichroic coloring molecule.

FIG. 2 is a section view showing a construction of the optical element 10, and FIG. 3 is an explanatory diagram of a dichroic coloring molecule.

Figure 4A:
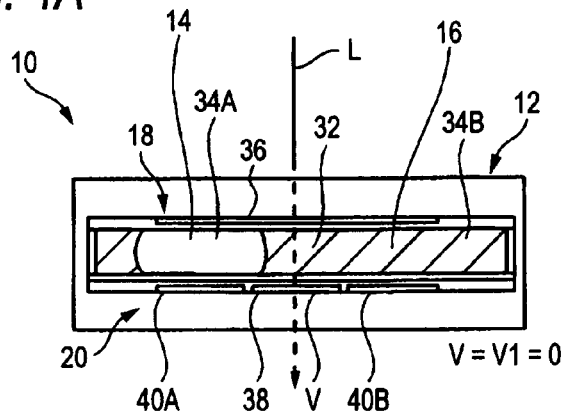
FIGS. 4A, 4C and 4E are explanatory diagrams on an operation of the optical element 10.
Figure 4B:
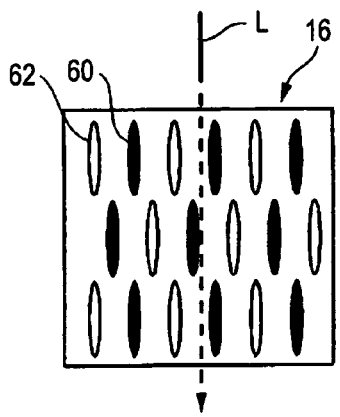
FIGS. 4B, 4D and 4F are explanatory diagrams on an operation of a guest-host liquid crystal.
Figure 4C:
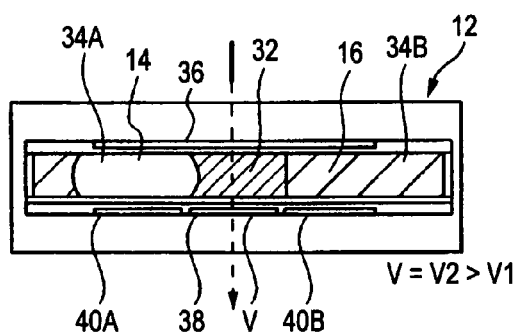
Figure 4D:
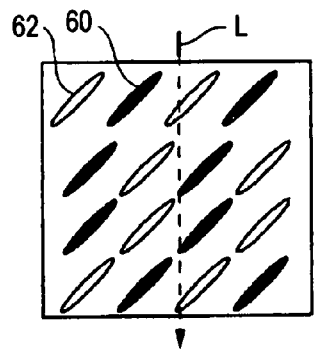
Figure 4E:
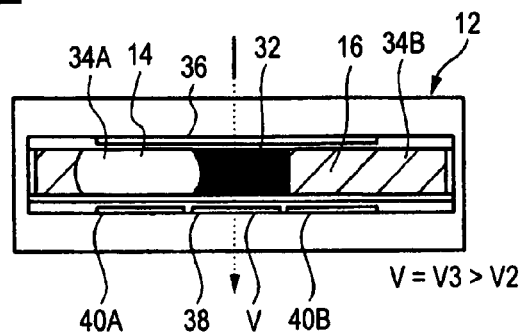
Figure 4F:
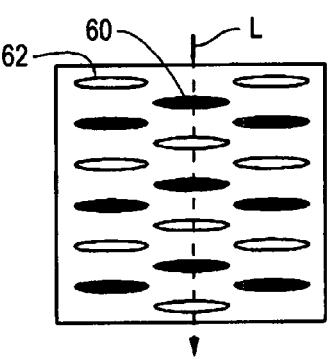

FIGS. 4A, 4C and 4E are explanatory diagrams on an operation of the optical element 10, and FIGS. 4B, 4D and 4F are explanatory diagrams on an operation of a guest-host liquid crystal.

As shown in FIG. 2, the optical element 10 includes a container 12, a first liquid 14, a liquid crystal 16, a first electrode 18 and a second electrode 20, and a voltage application section 22.

The container 12 has first and second end walls 24 and 26 facing against and extending in parallel with each other, side walls 28 connecting the first and second end walls 24 and 26 and a holding chamber 30 tightly enclosed by the first and second end walls 24 and 26 and the side walls 28.

The first and second end walls 24 and 26 contain an insulating material, and the first and second end walls 24 and 26 contain a transparent material that allows light to pass through.

The first and second end walls 24 and 26 may contain a transparent and insulating synthetic resin material or a transparent glass material, for example.

The expression, "the direction of thickness of the container 12", here refers to the direction in which the first end wall 24 and the second end wall 26 face against each other and which is the direction that light passes through the optical element 10.

According to this embodiment, the first and second end walls 24 and 26 have a same rectangular plate form in a same size. The side walls 28 have a rectangular frame form along the contours of the first and second end walls 24 and 26. The holding chamber 30 has a flat column form, and the holding chamber 30 has a uniform rectangular section extending in the direction orthogonal to the direction that light passes through. According to this embodiment, the direction of extension of the holding chamber 30 is parallel with the direction of the long side of the container 12.

The holding chamber 30 partially has an adjustment chamber 32 that light L passes through and has a lay-by chamber in the remaining part. According to this embodiment, the adjustment chamber 32 is positioned at the center of the holding chamber 30 in the direction of extension, and lay-by chambers 34A and 34B are positioned on both sides of the adjustment chamber 32. In other words, the adjustment chamber 32 and lay-by chambers 34A and 34B have the first and second end walls 24 and 26 which face against each other in the direction that light passes through.

The first and second end walls 24 and 26 contain an insulating material, and at least the part facing the adjustment chamber 32 of the first and second end walls 24 and 26 further contains a transparent material allowing light to pass through.

The first and second end walls 24 and 26 may contain an insulating synthetic resin material or glass material, for example.

The first liquid 14 is polarized or conductive and transparent and is filled in the holding chamber 30.

According to this embodiment, the first liquid 14 contains a liquid containing a mix of pure water, ethanol and ethylene glycol, for example.

The liquid crystal 16 corresponds to the second liquid 7 in FIG. 1A as described above, and the liquid crystal 16 does not mutually mix with the first liquid 14 and is filled around the first liquid 14 in the holding chamber 30.

The first liquid 14 and the liquid crystal 16 substantially have an equal specific gravity. The first liquid 14 may be a single liquid or a mix of multiple liquids. In other words, the first liquid 14 and the liquid crystal 16 may be only required to have a substantially equal specific gravity.

The liquid crystal 16 contains a guest-host liquid crystal. According to this embodiment, the guest-host liquid crystal is a liquid crystal formed by dissolving (adding) a dichroic coloring matter (or dichroic dye), which is guest, to a liquid crystal, which is host. In other words, the guest-host liquid crystal contains liquid crystal molecules, which are host, and dichroic coloring (or dichroic dye) molecules, which are guest.

The host liquid crystal has a negative dielectric anisotropy, which is called negative-type liquid crystal, according to this embodiment.

As shown in FIG. 3, a dichroic coloring molecule 60 has a coloring matter having anisotropy in the absorption and has a long and narrow stick structure in general. The dichroic coloring molecule 60 is of a positive type and has an axis of light absorption 60A (which may be called light absorption axis or light absorption amplitude) in the direction substantially equal to the longitudinal axis direction.

Thus, the dichroic coloring molecule 60 has an absorbance that increases as the direction of amplitude of light approaches the direction parallel to the axis of light absorption 60A and that decreases as the direction of amplitude of light approaches the direction orthogonal to the axis of light absorption 60A. The absorbance ratio (dichroic ratio (DR)) is a parameter exhibiting the characteristic, and the absorbance ratio in a liquid crystal is in the order of 10 to 12.

As shown in FIGS. 4B, 4D and 4F, when liquid crystal molecules 62 are aligned (inclined/declined) in a predetermined direction by the application of a voltage to the liquid crystal 16 (guest-host liquid crystal), the dichroic coloring molecules 60 are also aligned in accordance with the alignment of the liquid crystal molecules 62.

The first and second electrodes 18 and 20 are used for applying an electric field to the first liquid 14.

As shown in FIG. 2, the first electrode 18 is provided on the first end wall 24 of the adjustment chamber 32 and lay-by chambers 34A and 34B. According to this embodiment, the first electrode 18 includes a single electrode member 36 extending across the first end wall 24 of the adjustment chamber 32 and lay-by chambers 34A and 34B. According to this embodiment, as shown in FIG. 2, the electrode member 36 has rectangular contours, which is one-size-smaller than the contours of the first end wall 24.

The second electrode 20 is provided on the second end wall 26 of the adjustment chamber 32 and lay-by chambers 34A and 34B. According to this embodiment, the second electrode 20 includes a first electrode member 38 and two second electrode members 40A and 40B, which are separated from each other.

The second electrode member 38 is provided on the second end wall 26 of the adjustment chamber 32, and the two second electrode members 40A and 40B are provided in the lay-by chambers 34A and 34B, respectively.

According to this embodiment, the electrode members 38, 40A and 40B are similar in size and shape and are equally spaced apart from each other.

The first and second electrodes 18 and 20, that is, the electrode members 38, 40A and 40B may contain a conductive material such as an ITO film (Indium Tin Oxide film) that allows light to pass through, for example.

As shown in FIG. 2, the voltage application section 22 is provided outside of the container 12 and includes a ground terminal 42 electrically connecting to the first electrode 18, a first voltage output terminal 44 electrically connecting to the first electrode member 38 of the second electrode 20, and a second voltage output terminal 46 electrically connecting to the second electrode members 40A and 40B of the second electrode 20.

The voltage application section 22 is configured to be capable of applying a voltage selectively to each of the electrode members 38, 40A and 40B of the second electrode 20 through the first and second voltage output terminals 44 and 46 and adjusting the voltage to apply.

An insulating film 48 is provided on the internal surface of the second end wall 26 facing the holding chamber 30 and the second electrode 20 on the internal surface.

Thus, voltage is applied between the first electrode 18 and the second electrode 20, whereby the surface of the insulating film 48 may be positively charged, for example. Hence, an electric field is applied to the first liquid 14, and the electric field (electrostatic force) acts on the molecules of the first liquid 14. As a result, the first liquid 14 moves.

A transparent liquid crystal alignment film 50 through which light passes covers the entire area of the surface of the first electrode 18 and the entire area of the internal surface of the first end wall 24. A liquid crystal alignment film 50, which is the same as the above, covers the entire area of the surfaces of the first and second electrode members 38, 40A and 40B and the entire area of the internal surface of the second end wall 26. The liquid crystal alignment films 50 are for aligning the liquid crystal molecules 62, and various publicly known materials in the past may be adopted thereas.

A water-repellent film 52 covers the entire area of the internal surface of the end walls 28.

According to this embodiment, the liquid crystal alignment film 50 and water-repellent film 52 are configured such that the wettability against the liquid crystal 16 can be higher than the wettability against the first liquid 14. In other words, the angle of contact of the liquid crystal 16 against the liquid crystal alignment film 50 and water-repellent film 52 is configured so as to be smaller than the angle of contact of the first liquid 14 against the liquid crystal alignment film 50 and water-repellent film 52.

The liquid crystal alignment film 50 and water-repellent film 52 reduce the resistance caused between the first liquid 14 and the first and second end walls 24 and 26 and end walls 28 when the first liquid 14 moves on the first and second electrodes 18 and 20 such that the first liquid 14 can move easily.

The water-repellent film 52 is a lipophilic film and may be formed by burning a material mainly containing silicon thereto or by forming a film of a material containing amorphous fluoroplastics thereon, for example. Various publicly known materials in the past may be adopted as the water-repellent film 52.

Next, an operation of the optical element 10 will be described.

First of all, a state will be described in which the adjustment chamber 32 of the optical element 10 allows light to pass through, that is, the initial state in which the transmittance T is a maximum transmittance Tmax.

As shown in FIG. 2, the first liquid 14 is positioned between the electrode member 36 of the first electrode 18 and the first electrode member 38 of the second electrode 20 in the adjustment chamber 32.

Under this state, the voltage application section 22 applies the voltage E to the first electrode member 38 and opens (or applies the ground potential to) the two second electrode members 40A and 40B.

Thus, the electric field by the voltage E applied to the first electrode 18 and first electrode member 38 acts on the first liquid 14 facing the first electrode member 38, whereby the first liquid 14 does not move and can be held at the position. As a result, a most part of the first liquid 14 faces the first electrode member 38, and parts of the first liquid 14 face the adjacent two second electrode members 40A and 40B.

Under this condition, the incident light L traveling toward the adjustment chamber 32 passes through the transparent first liquid 14 in the adjustment chamber 32. Therefore, the transmittance T of the optical element 10 reaches the maximum transmittance Tmax, which may be 90% or higher, for example.

Next, an operation will be described in which the transmittance T for the light passing through the adjustment chamber 32 is adjusted to a lower value than the maximum transmittance Tmax.

The voltage application section 22 applies the voltage E to the one second electrode 40A, whereby the voltage to be applied to the first electrode member 38 and the other second electrode member 40B is changed to 0 V. In other words, the position subject to the voltage application to the second electrode 20 is changed from the first electrode member 38 to the one second electrode member 40A.

Thus, as shown in FIG. 4A, the electric field by the voltage E applied to the first electrode 18 and second electrode member 40A acts on the first liquid 14 facing the one second electrode member 40A, whereby the first liquid 14 surrounded by the liquid crystal 16 move toward the lay-by chamber 34A where the one second electrode member 40A positions.

Hence, the first liquid 14 is held by the one lay-by chamber 34A, and the adjustment chamber 32 is filled with the liquid crystal 16.

In this case, a most part of the first liquid 14 faces the one second electrode member 40A, and a part of the first liquid 14 faces the adjacent first electrode member 38.

Under this condition, the incident light traveling toward the adjustment chamber 32 passes through the liquid crystal 16 in the adjustment chamber 32.

Since no voltage is applied to the liquid crystal 16 in the adjustment chamber 32 in this case, the liquid crystal molecules 62 are substantially parallel with the direction that light passes through as shown in FIG. 4B. Thus, the axis of light absorption 60A of the dichroic coloring molecules 60 is substantially parallel with the direction that light passes through, and the axis of light absorption 60A is orthogonal to the direction of light amplitude (direction of vibrations).

Under this condition, the liquid crystal 16 is turned to a transmittance mode in which the light absorption by the dichroic coloring molecules 60 is minimum. The transmittance T1 in this case is slightly lower than the maximum transmittance Tmax, but a high transmittance T can be still obtained.

Next, the voltage application section 22 applies the voltage E to the one second electrode 40A and, at the same time, changes the voltage to be applied to the other second electrode member 40B to 0 V and changes the voltage V to be applied to the first electrode member 38 to a voltage V2, which is larger than the voltage V1.

Thus, as shown in FIG. 4C, the electric field by the voltage V2 applied between the first electrode 18 and first electrode member 38 only acts on a part of the liquid crystal 16 facing the first electrode member 38. Hence, as shown in FIG. 4D, the liquid crystal molecules 62 in the part of the liquid crystal 16 on which the electric field acts incline (align) along the direction determined by the liquid crystal alignment film 50, and the dichroic coloring molecules 60 thus incline (align) in accordance with the liquid crystal molecules 62.

As a result, the axis of light absorption 60A of the dichroic coloring molecules 60 inclines with respect to the direction that light passes through, and the axis of light absorption 60A inclines with respect to the direction of light amplitude. Since light is absorbed by the dichroic coloring molecules 60 in accordance with the degree of the inclination, the transmittance T2 in this case is lower than the transmittance T1.

Next, the voltage application section 22 applies the voltage E to the one second electrode 40A and, at the same time, changes the voltage to be applied to the other second electrode member 40B to 0 V and changes the voltage V to be applied to the first electrode member 38 to a voltage V3, which is larger than the voltage V2.

Thus, as shown in FIG. 4E, the electric field by the voltage V3 applied between the first electrode 18 and first electrode member 38 only acts on the part of the liquid crystal 16 facing the first electrode member 38. Hence, as shown in FIG. 4F, the liquid crystal molecules 62 in the part of the liquid crystal 16 on which the electric field acts further incline along the direction determined by the liquid crystal alignment film 50, and the dichroic coloring molecules 60 thus further incline in accordance with the liquid crystal molecules 62.

As a result, the axis of light absorption 60A of the dichroic coloring molecules 60 is substantially orthogonal to the direction that light passes through, and the axis of light absorption 60A is substantially parallel with the direction of light amplitude.

Under this condition, the liquid crystal 16 is turned to an absorption mode in which the light absorption by the dichroic coloring molecules 60 is maximum. The transmittance T3 in this case is further lower than the transmittance T2, and the minimum transmittance Tmin is obtained.

Notably, the minimum transmittance Tmin is adjustable by changing the value of the product of the density of the dichroic coloring matter in the liquid crystal 16 and the dimension of the liquid crystal 16 in the direction that light passes through.

In order to return the first liquid 14 from the lay-by chamber 34A to the adjustment chamber 32 to obtain the initial state, the voltage application section 22 changes the voltage to be applied to the second electrode 40A in the lay-by chamber 34A to 0 V and, at the same time, applies the voltage E to the first electrode member 38. In other words, the position subject to the voltage application to the second electrode 20 is changed from the one second electrode member 40A to the first electrode member 38.

Thus, as shown in FIG. 2, the electric field by the voltage E applied to the first electrode 18 and first electrode member 38 acts on the first liquid 14 facing the first electrode member 38, whereby the first liquid 14 surrounded by the liquid crystal 16 moves from the lay-by chamber 34A to the adjustment chamber 32.

Hence, the first liquid 14 is held in the adjustment chamber 32, and the liquid crystal 16 is held in the lay-by chambers 34A and 34B.

The voltages V1, V2 and V3 to be applied to the first electrode member 38 by the voltage application section 22 are smaller than the voltage E to be applied when the first liquid 14 moves between the adjustment chamber 32 and the lay-by chamber 34A. Therefore, the voltages V1, V2 and V3 applied to the first electrode member 38 do not move the first liquid 14 in the direction from the lay-by chamber 34A to the adjustment chamber 32.

As described above, the light absorption by the dichroic coloring molecules 60 can be changed serially by adjusting the voltage V to be applied to the liquid crystal 16 serially by the voltage application section 22. Thus, the transmittance T of the liquid crystal 16 in the adjustment chamber 32 can be serially adjusted. Therefore, the optical element 10 can be functioned as a dimmer (diaphragm).

Next, a case will be described in which the optical element 10 is provided as a dimmer in a shooting optical system of an imaging apparatus, such as a digital still camera and a video camera.

Figure 5:
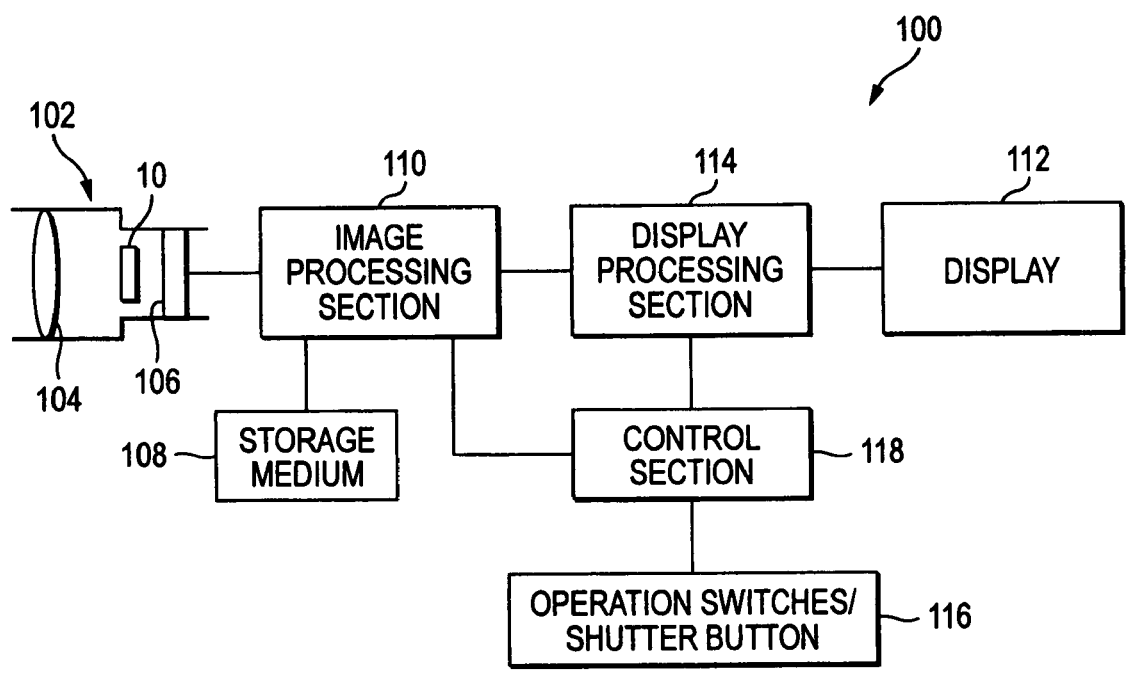
FIG. 5 is a block diagram showing a construction of an imaging apparatus 100.
Figure 6:
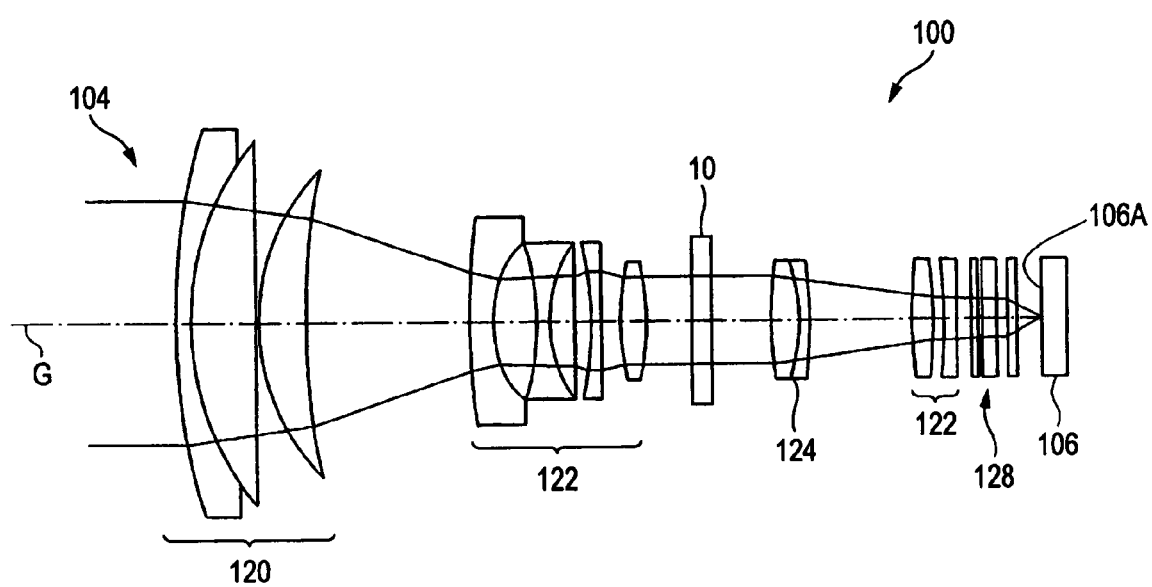
FIG. 6 is a diagram showing a construction of a shooting optical system 104 in the imaging apparatus 100.

FIG. 5 is a block diagram showing a construction of the imaging apparatus 100, and FIG. 6 is a diagram showing a construction of a shooting optical system 104 of the imaging apparatus 100.

As shown in FIG. 5, the imaging apparatus 100 has an external case, not shown, and the case has a lens barrel 102 built in and further has a display 112, a shutter button and operation switches 116 on the surface of the case. The operation switches 116 are used for performing various operations relating to shooting.

The shooting optical system 104 and an imaging device 106 are built in the lens barrel 102. The imaging device 106 images a subject image captured by the shooting optical system 104.

The imaging apparatus 100 includes an image processing section 110, a display processing section 114 and a control section 118. The image processing section 110 creates image data based on imaged signals output from the imaging device 106 and records it in a storage medium 108 such as a memory card. The display processing section 114 causes the display 112 to display the image data. The control section 118 includes a CPU that controls the image processing section 110 and the display processing section 114 in accordance with an operation on the shutter button and/or the operation switches 116.

As shown in FIG. 6, the shooting optical system 104 has, on an optical axis G, a first lens group 120, a second lens group 122, a third lens group 124, a fourth lens group 126 and a filter group 128 in order from a subject to the imaging device 106.

In this example, the first lens group 120 and third lens group 124 are not movable in the direction of the optical axis, and the second lens group 122 is movable in the direction of the optical axis as a zoom lens. The fourth lens group 126 is movable in the direction of the optical axis as a focus lens.

The pencils of light from a subject, which are guided by the first lens group 120, become parallel pencils of light by the second lens group 122, are guided to the third lens group 124 and are converged to an imaging plane 106A of the imaging device 106 through the fourth lens group 126 and filter group 128.

The optical element 10 is placed between the second lens group 122 and the third lens group 124, and the first liquid 14 is moved keeping the adjustment chamber 32 on the optical axis G and the direction that light passes through in parallel with the optical axis G. Thus, by adjusting the transmittance T of the liquid crystal 16, the first liquid 14 and the liquid crystal 16 can function as a dimmer that adjusts the amount of pencils of light to be guided to the imaging device 16. The dimmer may be used for reducing the amount of light in shooting in an environment with a high intensity, such as in a ski area and under a bright sky.

The optical element 10 may be only required to place on the optical axis G, and the optical element 10 may be placed immediately before the imaging plane 106A of the imaging device 106 like the filter group 128.

As described above, according to this embodiment, the maximum transmittance Tmax can be increased by positioning the transparent first liquid 14 in the adjustment chamber 32, and the transmittance T can be serially adjusted by positioning the liquid crystal 16 in the adjustment chamber 32, which is advantageous for fully increasing the dynamic range of the light passing through the optical element 10. Furthermore, the necessity of the mechanical structure that puts in and out the polarizer as in a dimmer in the past is eliminated, which is advantageous for decreasing the size, costs and power consumption.

Second Embodiment

A second embodiment will be described next.

According to the second embodiment, an optical apparatus includes two optical elements placed one over another.

Figure 7:
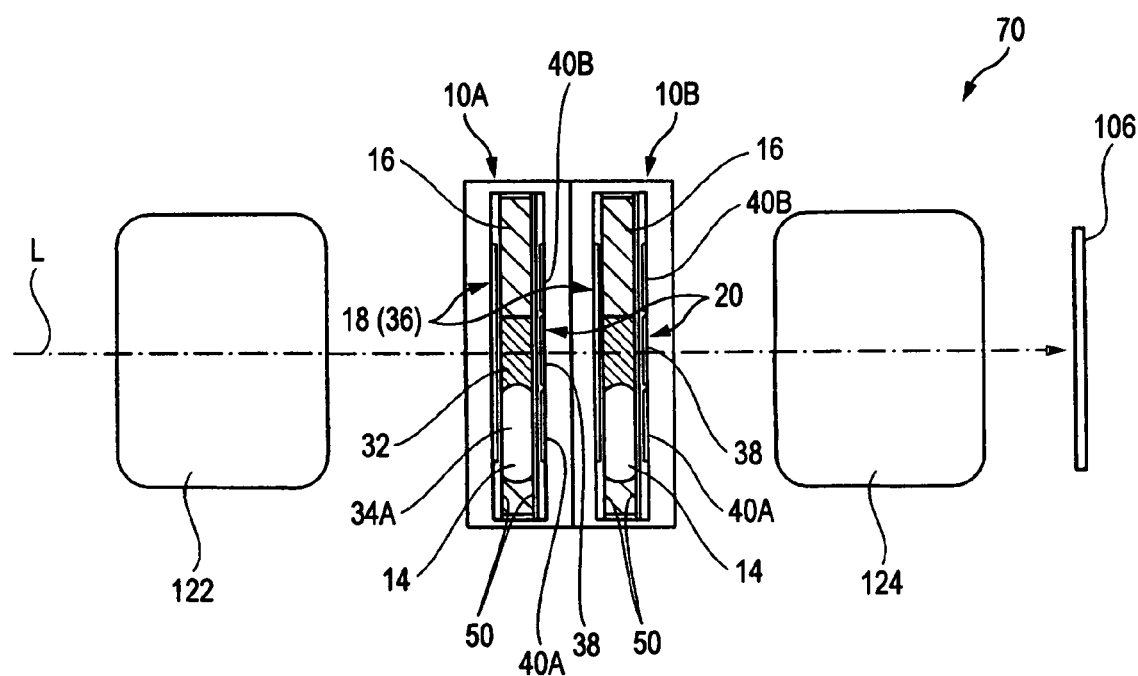
FIG. 7 is an explanatory diagram showing an optical apparatus 70 according to a second embodiment, which is built in the imaging apparatus 100.
Figure 8A:
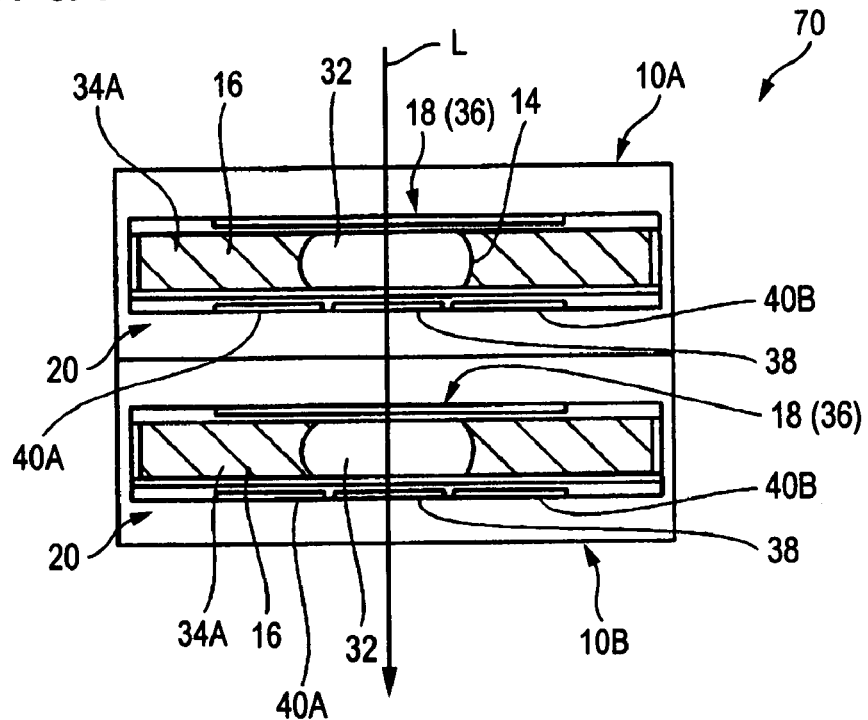
FIGS. 8A and 8B are explanatory diagrams on an operation of the optical apparatus 70 according to the second embodiment.
Figure 8B:
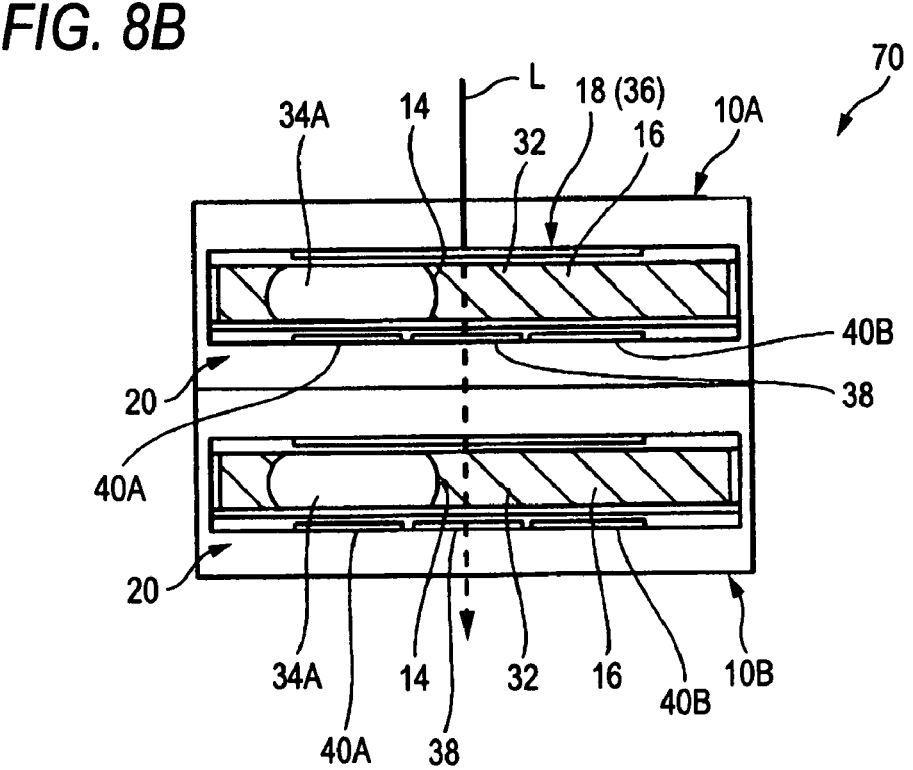
Figure 9:
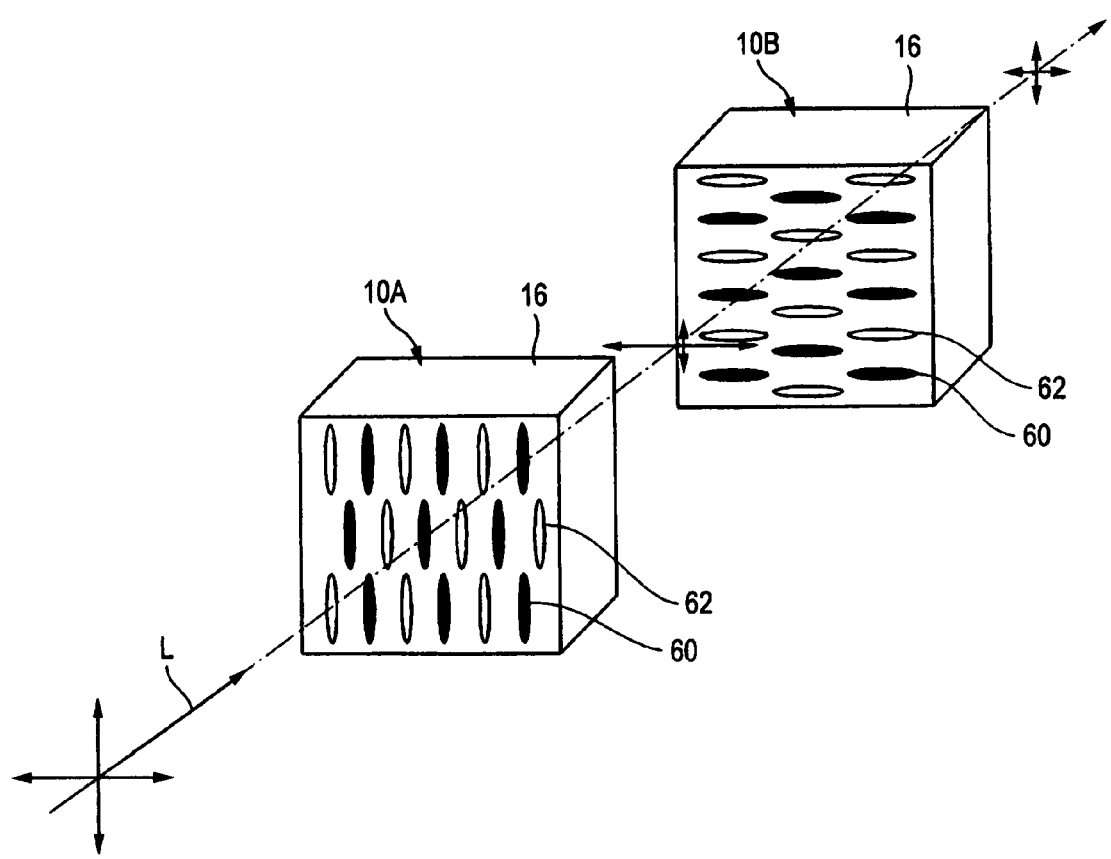
FIG. 9 is an explanatory diagram on the direction of alignment of liquid crystal molecules and dichroic coloring molecules.

FIG. 7 is an explanatory diagram showing an optical apparatus 70 according to the second embodiment, which is built in an imaging apparatus 100. FIGS. 8A and 8B are explanatory diagrams on an operation of the optical apparatus 70 according to the second embodiment. FIG. 9 is an explanatory diagram on the direction of alignment of liquid crystal molecules and dichroic coloring molecules.

The same reference numerals are given to the same or like parts and members as those in the first embodiment in the description below.

As shown in FIG. 7, the optical apparatus 70 according to the second embodiment is placed between the second lens group 122 and the third lens group 124 in FIG. 6.

In the optical apparatus 70, first and second optical elements 10A and 10B each having the same construction as that in the first embodiment are placed one over another by matching the direction that light passes therethrough and having the direction of alignment of the liquid crystal alignment film 50 in the first optical element 10A orthogonal to the direction of alignment of the liquid crystal alignment film 50 in the second optical element 10B at the sight from the direction that light passes through.

Therefore, as shown in FIG. 8A, a maximum transmittance Tmax can be obtained by positioning the first liquid 14 in the adjustment chambers 32 of both of the first and second optical elements 10A and 10B.

Furthermore, as shown in FIG. 8B, the transmittance T of the liquid crystal 16 in the first and second optical elements 10A and 10B can be adjusted by positioning the liquid crystal 16 in both of the adjustment chambers 32 of both of the first and second optical elements 10A and 10B.

The transmittance T of the liquid crystal 16 can be adjusted by positioning the first liquid 14 in the adjustment chamber 32 of one of the first and second optical elements 10A and 10B and positioning the liquid crystal 16 in the adjustment chamber 32 of the other of the first and second optical elements 10A and 10B.

FIG. 9 shows a state in which the liquid crystal 16 in both of the first and second optical elements 10A and 10B is in the absorption mode.

Since the directions of alignment of the liquid crystal alignment films 50 of the first and second optical elements 10A and 10B are orthogonal, the direction of alignment of the dichroic coloring molecules 60 and liquid crystal molecules 62 of the liquid crystal 16 in the first optical element 10A is orthogonal to the direction of alignment of the dichroic coloring molecules 60 and liquid crystal molecules 62 of the liquid crystal 16 in the second optical element 10B at the sight from the direction that light passes through.

Apparently in addition to the same effects as those of the first embodiment, the optical apparatus 70 according to the second embodiment can advantageously provides a constant transmittance T despite of the direction of polarization of incident light L since the incident light L is absorbed uniformly in all of the directions of polarization by the dichroic coloring molecules 60 in the first and second optical elements 10A and 10B through the optical apparatus 70.

In other words, when the number of the optical element 10 is one as in the first embodiment, the light with amplitudes in the direction parallel with the direction of alignment of the dichroic coloring molecules 60 is fully absorbed. However, the light with amplitudes in the direction orthogonal to the direction of alignment of the dichroic coloring molecules 60 is not fully absorbed and passes therethrough. Therefore, the transmittance T depends on the direction of amplitudes of light, which is disadvantageous for efficiently absorbing light.

Yet, a constant transmittance T can be obtained despite of the direction of polarization of incident light by orthogonalizing the directions of alignment of the liquid crystal alignment films 50 in the first and second optical elements 10A and 10B as in the second embodiment, which is advantageous for efficiently absorbing light.

Furthermore, as shown in FIG. 8A, a middle transmittance Tn between a transmittance T (maximum transmittance Tmax) with the first liquid 14 in both of the two adjustment chambers 32 as shown in FIG. 8A and the transmittance T0 with the liquid crystal 16 in the transmission mode in both of the two adjustment chambers 32 as shown in FIG. 8B (where T0<Tn<Tmax) can be obtained as follows.

That is, the middle transmittance Tn (where T0<Tn<Tmax) can be obtained by positioning the first liquid 14 in the adjustment chamber 32 of one of the first and second optical elements 10A and 10B, positioning the liquid crystal 16 in the adjustment chamber 32 of the other of the first and second optical elements 10A and 10B and changing the liquid crystal 16 to the transmittance mode.

Therefore, the transmittance T by the optical apparatus 70 can be adjusted advantageously in more detail.

Having described the second embodiment in which the first and second optical elements 10A and 10B placed one over another, placing the single optical element 10 and a polarizer one over another can also provide the same effects as those of the second embodiment.

In this case, the axis of polarization of the polarizer may be configured to be orthogonal to the direction of alignment of the liquid crystal alignment film 50 of the optical element 10 at the sight from the direction that light passes through.

However, placing a polarizer on an optical axis (or on an optical path) is disadvantageous for obtaining a high maximum transmittance Tmax since light is absorbed by the polarizer. On the other hand, according to the second embodiment, the light absorption by positioning the transparent first liquid 14 in the adjustment chambers 32 of both of the first and second optical elements 10A and 10B can be lower than the light absorption by the polarizer, which is advantageous for obtaining the maximum transmittance Tmax.

Having described the case in which two optical elements are placed one over another according to the second embodiment, three or more optical elements can be placed one over another, which is more advantageous for adjusting the middle transmittance Tn in more details.

Third Embodiment

A third embodiment will be described next.

The third embodiment is different from the first embodiment in that a liquid crystal is moved by an electric field.

Figure 10:
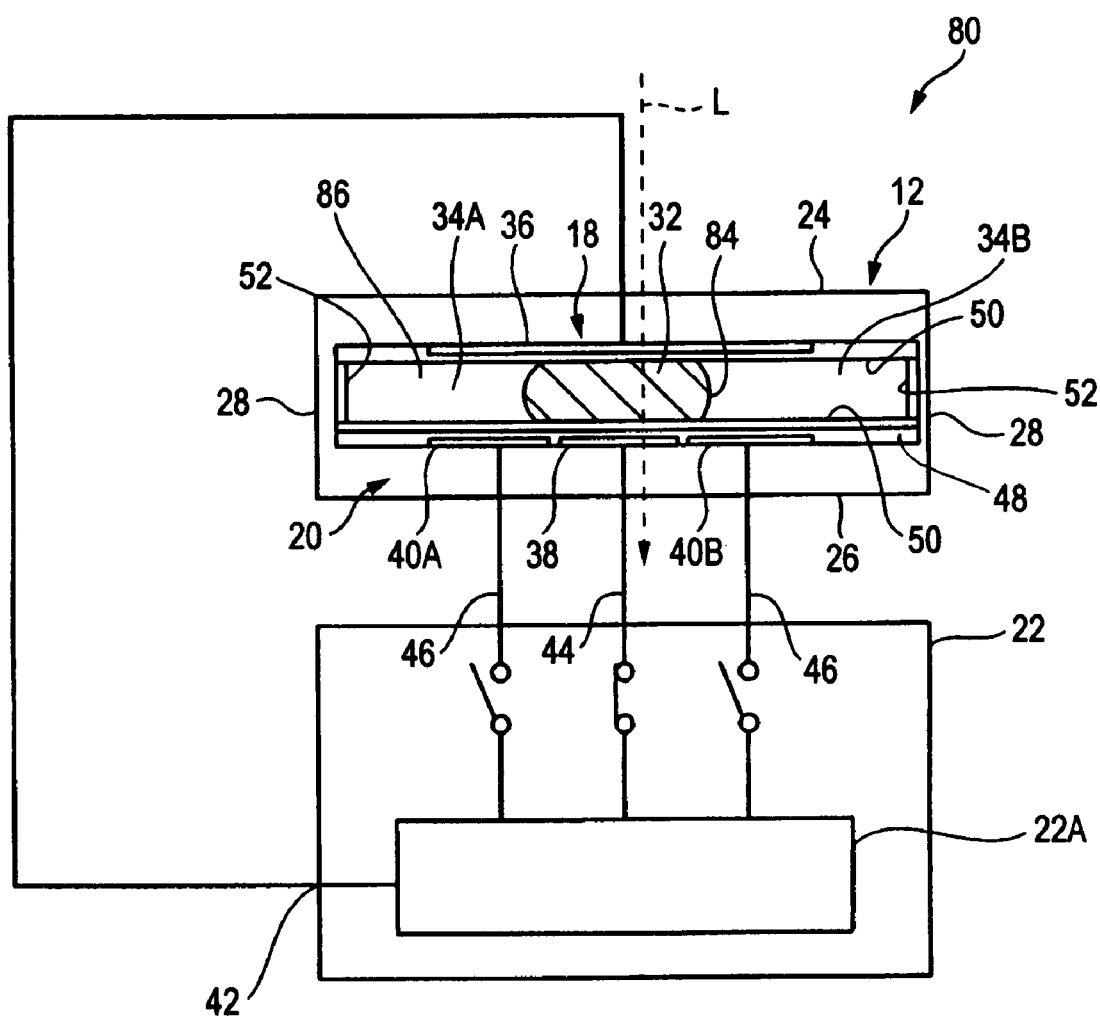
FIG. 10 is a section diagram showing a construction of an optical element 80 according to a third embodiment.

FIG. 10 is a section diagram showing a construction of an optical element 80 according to the third embodiment.

As shown in FIG. 10, the optical element 80 includes a container 12, a liquid crystal 84, a second liquid 86, a first electrode 18, a second electrode 20 and a voltage application section 22.

The constructions of the container 12, adjustment chamber 32, lay-by chambers 34A and 34B, first and second electrodes 18 and 20, insulating film 48, liquid crystal alignment film 50, water-repellent film 52 and voltage application section 22 are the same as those of the first embodiment.

According to the third embodiment, the liquid crystal 84 corresponds to the first liquid 6 in FIG. 1A as described above. The liquid crystal 84 does not mutually mix with the second liquid 86, contains a polarized or conductive guest-host liquid crystal (with a high dielectric constant) and is filled in the holding chamber 30. The guest-host liquid crystal contains the liquid crystal molecules 62 and dichroic coloring molecules 60, which are similar to those in the first embodiment.

The second liquid 86 is a transparent liquid, which does not mutually mix with the liquid crystal 84, and is filled around the liquid crystal 84 in the holding chamber 30.

The liquid crystal 84 and the second liquid 86 have a substantially equal specific gravity.

According to this embodiment, the second liquid 86 contains a transparent silicon oil. The second liquid 86 may contain a single liquid or may contain a mix of multiple liquids. In other words, the liquid crystal 84 and the second liquid 86 may be only required to have a substantially equal specific gravity.

In the optical element 80, the transmittance T can be increased to the maximum transmittance Tmax by laying the liquid crystal 84 by in the lay-by chamber 34A and positioning the second liquid 86 in the adjustment chamber 32 by applying the voltage E to the first and second electrodes 18 and 20. Furthermore, the transmittance T of the liquid crystal 84 can be adjusted serially by positioning the liquid crystal 84 in the adjustment chamber 32 by applying the voltage E to the first and second electrodes 18 and 20 and serially adjusting the voltage V to be applied between the first electrode 18 and the first electrode member 38.

Thus, the maximum transmittance Tmax can be increased by positioning the transparent second liquid 86 in the adjustment chamber 32, and the transmittance T can be serially adjusted by positioning the liquid crystal 84 in the adjustment chamber 32, which is advantageous for fully increasing the dynamic range of the light passing through the optical element 80. Furthermore, the necessity of the mechanical structure that puts in and out the polarizer as in a dimmer in the past is eliminated, which is advantageous for decreasing the size, costs and power consumption.

The same effects as those of the second embodiment can be provided by placing two optical elements 80 according to the third embodiment one over another as in the second embodiment. Furthermore, three or more optical elements 80 according to the third embodiment can be placed one over another.

Having described the case in which the imaging apparatus 100 is a digital still camera or video camera according to this embodiment, the invention is widely applicable to various imaging apparatuses such as a cellular phone with a camera, a Personal Digital Assistant (PDA) with a camera and a notebook PC with a camera.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical element comprising:
a container having a holding chamber;
a polarized or conductive and transparent first liquid filled in the holding chamber;
a liquid crystal filled in the holding chamber and not mutually mixing with the first liquid;
first and second electrodes applying an electric field to the first liquid; and
voltage application means for applying voltage between the first electrode and the second electrode, wherein the change of the position subject to the voltage application by the voltage application means to the first and second electrodes moves the first liquid in the liquid crystal within the holding chamber;

the liquid crystal contains a guest-host liquid crystal;

the holding chamber partially has an adjustment chamber through which light passes and a lay-by chamber in the remaining part;

the adjustment chamber and the lay-by chamber have first and second end walls facing against each other in the direction that light passes through;

the first electrode is provided on one end wall of the first and second end walls of the adjustment chamber and lay-by chamber;

the second electrode is provided on the other end wall of the first and second end walls; and the second electrode has a first electrode member facing the adjustment chamber and a second electrode member being separated from the first electrode member and facing the lay-by chamber.

2. The optical element according to claim 1, wherein the guest-host liquid crystal contains liquid crystal molecules, which are host, and dichroic coloring molecules, which are guest.

3. The optical element according to claim 1, wherein a liquid crystal alignment film covers the surface of the first electrode facing the adjustment chamber and the surface of the first electrode member facing the adjustment chamber.

4. The optical element according to claim 3, wherein the liquid crystal alignment film is water-repellent.

5. The optical element according to claim 1, wherein the first electrode has a single electrode member on the one end wall, the single electrode member extending across the entire area of the end wall in the direction of extension.

6. An optical apparatus comprising two optical elements each having:

a container having a holding chamber;

a polarized or conductive and transparent first liquid filled in the holding chamber;

a liquid crystal filled in the holding chamber and not mutually mixing with the first liquid;

first and second electrodes applying an electric field to the first liquid; and voltage application means for applying voltage between the first electrode and the second electrode, wherein the change of the position subject to the voltage application by the voltage application means to the first and second electrodes moves the first liquid in the liquid crystal within the holding chamber;

the liquid crystal contains a guest-host liquid crystal;

the holding chamber partially has an adjustment chamber through which light passes and a lay-by chamber in the remaining part;

the adjustment chamber and the lay-by chamber have first and second end walls facing against each other in the direction that light passes through;

the first electrode is provided on one end wall of the first and second end walls of the adjustment chamber and lay-by chamber;

the second electrode is provided on the other end wall of the first and second end walls;

the second electrode has a first electrode member facing the adjustment chamber and a second electrode member being separated from the first electrode member and facing the lay-by chamber;

a liquid crystal alignment film covers the surface of the first electrode facing the adjustment chamber and the surface of the first electrode member facing the adjustment chamber;

the two optical elements have the adjustment chambers in the direction that light passes through, the adjustment chambers having the thickness in a same direction; and the direction of alignment of the liquid crystal alignment film of one optical element of the two optical elements is orthogonal to the direction of alignment of the liquid crystal alignment film of the other optical element of the two optical elements at the sight from the direction that light passes through.

7. An optical element comprising:

a container having a holding chamber;

a polarized or conductive liquid crystal filled in the holding chamber;

a second liquid filled in the holding chamber and not mutually mixing with the liquid crystal;

first and second electrodes applying an electric field to the liquid crystal; and voltage application means for applying voltage between the first electrode and the second electrode, wherein the change of the position subject to the voltage application by the voltage application means to the first and second electrodes moves the liquid crystal in the second liquid within the holding chamber;

the liquid crystal contains a guest-host liquid crystal;

the holding chamber partially has an adjustment chamber through which light passes and a lay-by chamber in the remaining part;

the adjustment chamber and the lay-by chamber have first and second end walls facing against each other in the direction that light passes through;

the first electrode is provided on one end wall of the first and second end walls of the adjustment chamber and lay-by chamber;

the second electrode is provided on the other end wall of the first and second end walls; and the second electrode has a first electrode member facing the adjustment chamber and a second electrode member being separated from the first electrode member and facing the lay-by chamber.

8. An imaging apparatus comprising:

a shooting optical system guiding a subject image;

an imaging device on an optical axis of the shooting optical system; and an optical element before the imaging device on the optical axis, the optical element having:

a container having a holding chamber;

a polarized or conductive and transparent first liquid filled in the holding chamber;

a liquid crystal filled in the holding chamber and not mutually mixing with the first liquid;

first and second electrodes applying an electric field to the first liquid; and voltage application means for applying voltage between the first electrode and the second electrode, wherein the change of the position subject to the voltage application by the voltage application means to the first and second electrodes moves the first liquid in the liquid crystal within the holding chamber;

the liquid crystal contains a guest-host liquid crystal;

the holding chamber partially has an adjustment chamber through which light passes and a lay-by chamber in the remaining part;

the adjustment chamber and the lay-by chamber have first and second end walls facing against each other in the direction that light passes through;

the first electrode is provided on one end wall of the first and second end walls of the adjustment chamber and lay-by chamber;

the second electrode is provided on the other end wall of the first and second end walls; and the second electrode has a first electrode member facing the adjustment chamber and a second electrode member being separated from the first electrode member and facing the lay-by chamber.

9. An imaging apparatus comprising:

a shooting optical system guiding a subject image;

an imaging device on an optical axis of the shooting optical system; and an optical element before the imaging device on the optical axis, the optical element having:

a container having a holding chamber;

a polarized or conductive liquid crystal filled in the holding chamber;

a second liquid filled in the holding chamber and not mutually mixing with the liquid crystal;

first and second electrodes applying an electric field to the liquid crystal; and voltage application means for applying voltage between the first electrode and the second electrode, wherein the change of the position subject to the voltage application by the voltage application means to the first and second electrodes moves the liquid crystal in the second liquid within the holding chamber;

the liquid crystal contains a guest-host liquid crystal;

the holding chamber partially has an adjustment chamber through which light passes and a lay-by chamber in the remaining part;

the adjustment chamber and the lay-by chamber have first and second end walls facing against each other in the direction that light passes through;

the first electrode is provided on one end wall of the first and second end walls of the adjustment chamber and lay-by chamber;

the second electrode is provided on the other end wall of the first and second end walls; and the second electrode has a first electrode member facing the adjustment chamber and a second electrode member being separated from the first electrode member and facing the lay-by chamber.

10. An optical element comprising:

a container having a holding chamber;

a polarized or conductive and transparent first liquid filled in the holding chamber;

a liquid crystal filled in the holding chamber and not mutually mixing with the first liquid;

first and second electrodes applying an electric field to the first liquid; and a voltage application section for applying voltage between the first electrode and the second electrode, wherein the change of the position subject to the voltage application by the voltage application section to the first and second electrodes moves the first liquid in the liquid crystal within the holding chamber;

the liquid crystal contains a guest-host liquid crystal;

the holding chamber partially has an adjustment chamber through which light passes and a lay-by chamber in the remaining part;

the adjustment chamber and the lay-by chamber have first and second end walls facing against each other in the direction that light passes through;

the first electrode is provided on one end wall of the first and second end walls of the adjustment chamber and lay-by chamber;

the second electrode is provided on the other end wall of the first and second end walls; and the second electrode has a first electrode member facing the adjustment chamber and a second electrode member being separated from the first electrode member and facing the lay-by chamber.

11. An optical apparatus comprising two optical elements each having:

a container having a holding chamber;

a polarized or conductive and transparent first liquid filled in the holding chamber;

a liquid crystal filled in the holding chamber and not mutually mixing with the first liquid;

first and second electrodes applying an electric field to the first liquid; and a voltage application section for applying voltage between the first electrode and the second electrode, wherein the change of the position subject to the voltage application by the voltage application section to the first and second electrodes moves the first liquid in the liquid crystal within the holding chamber;

the liquid crystal contains a guest-host liquid crystal;

the holding chamber partially has an adjustment chamber through which light passes and a lay-by chamber in the remaining part;

the adjustment chamber and the lay-by chamber have first and second end walls facing against each other in the direction that light passes through;

the first electrode is provided on one end wall of the first and second end walls of the adjustment chamber and lay-by chamber;

the second electrode is provided on the other end wall of the first and second end walls;

the second electrode has a first electrode member facing the adjustment chamber and a second electrode member being separated from the first electrode member and facing the lay-by chamber;

a liquid crystal alignment film covers the surface of the first electrode facing the adjustment chamber and the surface of the first electrode member facing the adjustment chamber;

the two optical elements have the adjustment chambers in the direction that light passes through, the adjustment chambers having the thickness in a same direction; and the direction of alignment of the liquid crystal alignment film of one optical element of the two optical elements is orthogonal to the direction of alignment of the liquid crystal alignment film of the other optical element of the two optical elements at the sight from the direction that light passes through.

12. An optical element comprising:

a container having a holding chamber;

a polarized or conductive liquid crystal filled in the holding chamber;

a second liquid filled in the holding chamber and not mutually mixing with the liquid crystal;

first and second electrodes applying an electric field to the liquid crystal; and a voltage application section for applying voltage between the first electrode and the second electrode, wherein the change of the position subject to the voltage application by the voltage application section to the first and second electrodes moves the liquid crystal in the second liquid within the holding chamber;

the liquid crystal contains a guest-host liquid crystal;

the holding chamber partially has an adjustment chamber through which light passes and a lay-by chamber in the remaining part;

the adjustment chamber and the lay-by chamber have first and second end walls facing against each other in the direction that light passes through;

the first electrode is provided on one end wall of the first and second end walls of the adjustment chamber and lay-by chamber;

the second electrode is provided on the other end wall of the first and second end walls; and the second electrode has a first electrode member facing the adjustment chamber and a second electrode member being separated from the first electrode member and facing the lay-by chamber.

13. An imaging apparatus comprising:

a shooting optical system guiding a subject image;

an imaging device on an optical axis of the shooting optical system; and an optical element before the imaging device on the optical axis, the optical element having:

a container having a holding chamber;

a polarized or conductive and transparent first liquid filled in the holding chamber;

a liquid crystal filled in the holding chamber and not mutually mixing with the first liquid;

first and second electrodes applying an electric field to the first liquid; and a voltage application section for applying voltage between the first electrode and the second electrode, wherein the change of the position subject to the voltage application by the voltage application section to the first and second electrodes moves the first liquid in the liquid crystal within the holding chamber;

the liquid crystal contains a guest-host liquid crystal;

the holding chamber partially has an adjustment chamber through which light passes and a lay-by chamber in the remaining part;

the adjustment chamber and the lay-by chamber have first and second end walls facing against each other in the direction that light passes through;

the first electrode is provided on one end wall of the first and second end walls of the adjustment chamber and lay-by chamber;

the second electrode is provided on the other end wall of the first and second end walls; and the second electrode has a first electrode member facing the adjustment chamber and a second electrode member being separated from the first electrode member and facing the lay-by chamber.

14. An imaging apparatus comprising:

a shooting optical system guiding a subject image;

an imaging device on an optical axis of the shooting optical system; and an optical element before the imaging device on the optical axis, the optical element having:

a container having a holding chamber;

a polarized or conductive liquid crystal filled in the holding chamber;

a second liquid filled in the holding chamber and not mutually mixing with the liquid crystal;

first and second electrodes applying an electric field to the liquid crystal; and a voltage application section for applying voltage between the first electrode and the second electrode, wherein the change of the position subject to the voltage application by the voltage application section to the first and second electrodes moves the liquid crystal in the second liquid within the holding chamber;

the liquid crystal contains a guest-host liquid crystal;

the holding chamber partially has an adjustment chamber through which light passes and a lay-by chamber in the remaining part;

the adjustment chamber and the lay-by chamber have first and second end walls facing against each other in the direction that light passes through;

the first electrode is provided on one end wall of the first and second end walls of the adjustment chamber and lay-by chamber;

the second electrode is provided on the other end wall of the first and second end walls; and the second electrode has a first electrode member facing the adjustment chamber and a second electrode member being separated from the first electrode member and facing the lay-by chamber.

* * * * *